UNITED STATES PATENT OFFICE.

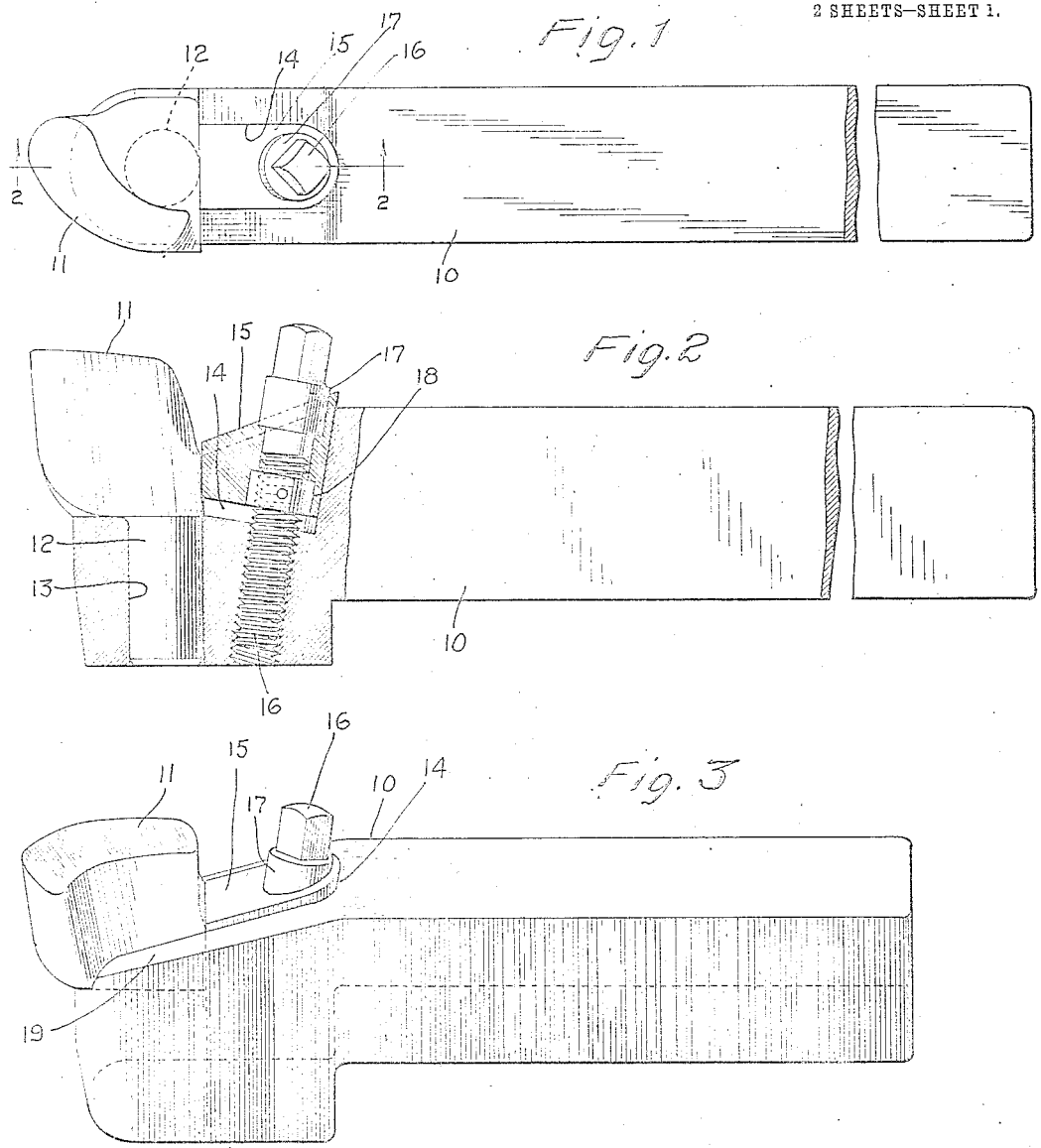

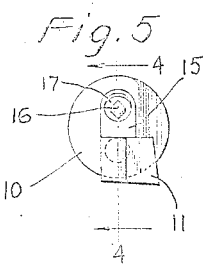
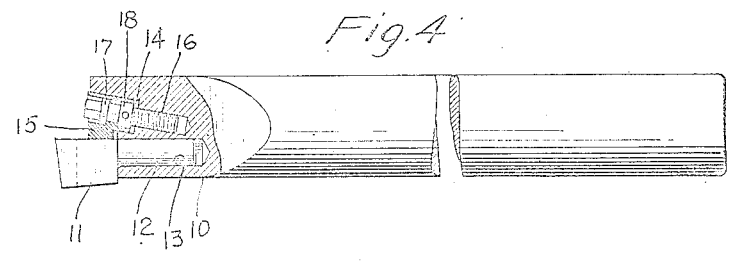
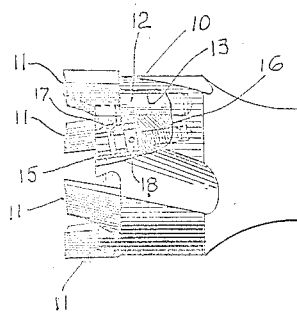
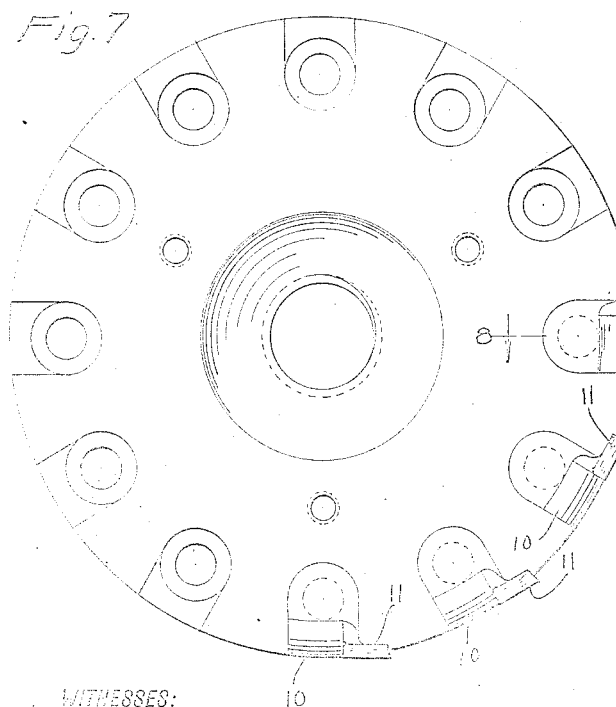
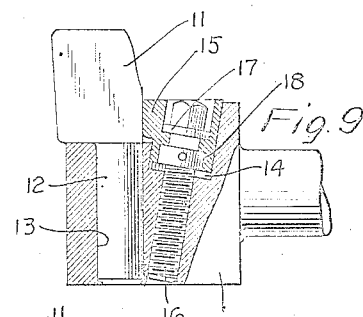
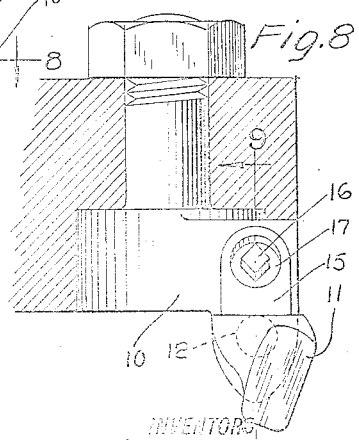

GEORGE W. CONKLIN AND PEARL H. ROBINSON, OF SHELTON, CONNECTICUT, ASSIGNORS TO THE O. K. TOOL HOLDER COMPANY, OF SHELTON, CONNECTICUT, A CORPORATION OF NEW YORK.

TOOL-HOLDER.

1,056,089. Specification of Letters Patent. Patented Mar. 18, 1913.

Application filed May 4, 1912. Serial No. 695,021.

*To all whom it may concern:*

Be it known that we, GEORGE W. CONKLIN and PEARL H. ROBINSON, citizens of the United States, residing at Shelton, county of Fairfield, State of Connecticut, have invented an Improvement in Tool-Holders, of which the following is a specification.

This invention has for its object to provide a tool holder adapted for general use upon lathes, planing machines, shaping machines, boring mills, etc., which shall be quick-acting, durable and will give a positive grip upon the tool.

With these and other objects in view, we have devised the novel tool holder of which the following description in connection with the accompanying drawings is a specification, reference characters being used to indicate the several parts.

Figure 1 is a plan view, showing the application of our novel invention to an ordinary type of lathe tool; Fig. 2, a side elevation, partly in vertical section, corresponding therewith; Fig. 3, a perspective illustrating the application of the invention to a boring mill tool; Fig. 4, an elevation partly in section on the line 4—4 in Fig. 5, looking in the direction of the arrows, illustrating the application of the invention to a boring bar; Fig. 5, an end elevation corresponding with Fig. 4; Fig. 6, an elevation partly broken away, illustrating the application of the invention to an end milling cutter; Fig. 7, an elevation illustrating the application of the invention to a face milling cutter, a portion of the tools being removed; Fig. 8, an enlarged detail sectional view on the line 8—8 in Fig. 7, looking in the direction of the arrows, illustrating the holder and tool; and Fig. 9 is a detail sectional view of the tool holder on the line 9—9 in Fig. 8, looking in the direction of the arrows.

10 denotes the body of our novel tool holder and 11 a tool comprising a body of any required type and a shank 12 extending downward therefrom and adapted to engage a hole 13 in the body. Back of and above hole 13 is a recess 14 which receives a block 15. The rear wall of the block and the corresponding wall of the recess against which it bears lie at an angle to the shank of the tool. The front wall of the block bears against the back of the tool and acts to crowd the tool forward and downward locking it tightly in place. The engaging walls of the tool and the block may lie in a plane parallel with the axis of the shank or may, if preferred, lie at a slight angle in either direction, which, however, must be a lesser angle than the angle of the back of the block in order to secure a wedging action against the tool as the block is forced downward. The block is provided with a hole through it which receives a screw 16, the axis of the screw lying parallel with the rear wall of the block and consequently at an angle to the shank of the tool and also to the back of the tool. In the upper side of the block is a recess which receives a collar 17 on a screw, shown in the present instance as formed integral therewith. Upon the under side of the block is a recess which receives a collar 18, which is pinned or otherwise rigidly secured to the screw. The screw turns freely in the hole in the block; that is without engagement therewith, but has threaded engagement with the hole in the body. It is obvious that forward rotation of the screw will cause collar 17 to force the block downward and the rear incline of recess 14 will force it forward against the back of the tool and lock the tool securely in place, while backward rotation of the screw will cause collar 18 to raise the block and release the tool.

The form illustrated in Fig. 3 differs from the first form in that the body is provided with a wall 19 which is specially provided to form a support for the tool on the side opposite to the cutting edge.

In Figs. 4 and 5, we have illustrated the application of the invention to a boring bar, in Fig. 6 to an end milling cutter and in Figs. 7, 8 and 9 to a face milling cutter. The principle of operation is precisely the same in the various forms.

Having thus described our invention, we claim:

1. In combination, a tool holder comprising a body having a recess and a hole at its forward end, a tool comprising a body and a shank adapted to engage the hole, the tool body being larger than its shank and resting in the recess, and means in said recess engaging the rear wall of the tool body and adapted to force it outward and downward to lock the shank in the hole.

2. In combination, a tool holder comprising a body having a recess and a hole at its forward end, a tool comprising a body and a shank adapted to engage the hole, the tool body being larger than its shank and resting in the recess, a block engaging the rear wall of the tool body and a screw for operating the block to force the tool body outward and downward, for the purpose set forth.

3. In combination, a tool holder comprising a body having a hole, and back of and above said hole a recess with an inclined rear wall, a tool comprising a body and a shank extending downward therefrom and engaging the hole, the tool body being larger than its shank and resting in the recess, a block engaging the rear wall of the recess and the back of the tool body and a screw for moving the block in or out to lock or release the tool shank in the hole.

In testimony whereof we affix our signatures in presence of two witnesses.

GEORGE W. CONKLIN.
PEARL H. ROBINSON.

Witnesses:
EDW. W. KNEEN,
ALFRED SELMNONRICK.